Figure 1:
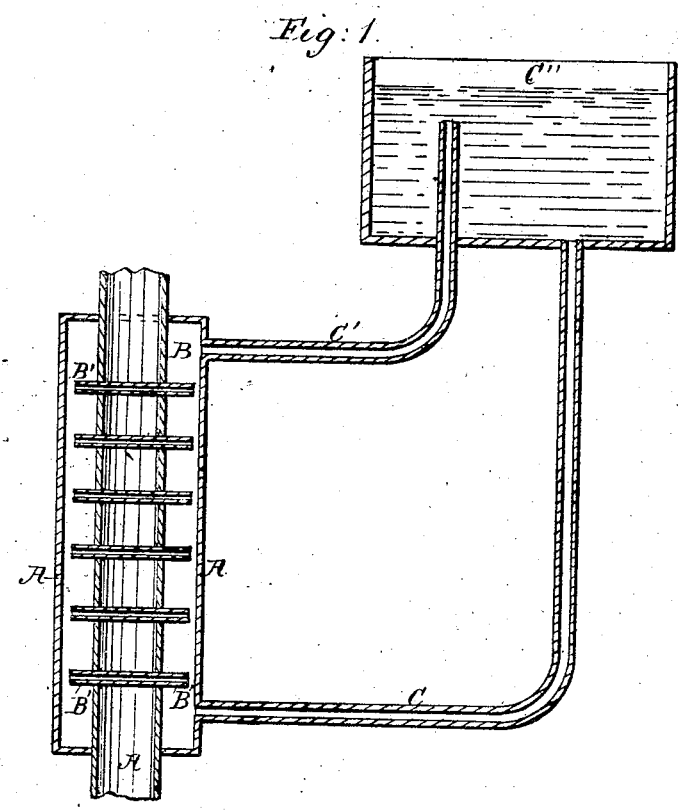

N. ROWE.
Stovepipe Water-Heater.

No. 101,923.

Patented April 12, 1870.

Witnesses
Ch Clausen
Jno. R. Edson

Inventor.
N. Rowe
D. P. Holloway & Co
Atty

United States Patent Office.

NATHANIEL ROWE, OF EMMITTSBURG, MARYLAND.

Letters Patent No. 101,923, dated April 12, 1870.

---

WATER-HEATING ATTACHMENT FOR STOVE-PIPES.

---

The Schedule referred to in these Letters Patent and making part of the same.

---

*To all whom it may concern:*

Be it known that I, NATHANIEL ROWE, of Emmitsburg, in the county of Frederick and State of Maryland, have invented certain Improvements in Stove-Pipes; and I do hereby declare that the following is a full, clear, and exact description thereof, reference being had to the annexed drawings making part of this specification, in which—

Figure 1 is a vertical section of a joint of pipe, having my improvement connected therewith, showing the water-space for the water between the two cylinders, and the pipes for connecting with it a tank or reservoir for the water to be heated.

Corresponding letters refer to corresponding parts.

This invention relates to an improvement in Stove-Pipes, by which any one section or joint of such pipes may be converted into a heater for heating water for any purpose; and It consists in providing a section or joint of such pipe with a conduit or passage through which water may circulate and be heated by the gases which escape from the burning fuel on their passage to the chimney or flue which conducts them to the atmosphere, as will be more fully explained hereinafter.

It is well known to persons familiar with stoves that a considerable amount of the heat resulting from the fuel burned therein is lost by being passed off through the pipe, which, if properly utilized, would heat a large amount of water for cooking and for other purposes.

My object in the present invention is to provide a means of rendering available the heat thus lost.

To enable those skilled in the art to make and use my invention, I will proceed to describe its construction and operation.

A in the drawings refers to a section or joint of a stove-pipe, which is enlarged throughout the greater portion of its length to enable it to receive the water conduit, as shown in the drawings.

The reduced portions A' of this section are to receive the ordinary stove-pipe, and may be of any size required.

B refers to a space for water which is formed by extending the reduced portions A' through the larger portion A, and forming a tight joint at the heads thereof.

B' refers to a series of small pipes which pass through the portion A' transversely and extend beyond its surface for some distance, but not far enough to come in contact with the outer shell A.

The ends of these pipes communicate with the space B, so that the water may flow freely through them, and be heated by the escaping gases within the portion A' of the pipe.

C and C¹ are pipes leading respectively from the upper and lower ends of the water-space B to and connect with a water-reservoir, C², which latter may be arranged at any convenient point near the stove.

The operation of this device will be as follows:

The section of the pipe having been constructed as shown in the drawings, it is to be placed upon the stove, and should generally be arranged to constitute the first joint of the pipe. When thus placed, a pipe, C, is to be connected with the lower end of the circulating space, from which point it is to extend to and be connected with the water-reservoir at or near its bottom, while to the upper end of said space B there is to be connected another pipe C¹, which is to extend to and deliver the water to the reservoir at some point above that where the pipe C takes it from such reservoir.

When the parts have been constructed and arranged as above described, and a fire has been kindled in the stove with which they are to be used, and water has been supplied to the reservoir, it will fill the water-space B, and, as it becomes heated by the escaping gases, the water will rise in the space and pass out through the pipe C¹ into the reservoir, and the cooler water from such reservoir will pass in through the pipe C and take the place of that expelled by the heat, and thus a continuous circulation of the water will be kept up as long as the heat in the stove-pipe is sufficient for that purpose.

Having thus described my invention,

What I claim, and desire to secure by Letters Patent, is—

The combination and arrangement of the stove-pipe section A, constructed with a water-space, B, and circulating-pipes B', the pipes C and C¹ and the water reservoir C², substantially as set forth.

In testimony whereof, I have signed my name to this specification, in the presence of two subscribing witnesses.

NATHANIEL ROWE.

Witnesses:
 HENRY STOKES,
 SAMUEL MOTTER.